United States Patent [19]

Kawabe

[11] Patent Number: 5,201,477
[45] Date of Patent: Apr. 13, 1993

[54] SPINNING REEL WITH DRAG BRAKE MECHANISM AND CLUTCH

[75] Inventor: Yuzo Kawabe, Izumi, Japan

[73] Assignee: Shimano, Inc., Osaka, Japan

[21] Appl. No.: 506,783

[22] Filed: Apr. 10, 1990

[30] Foreign Application Priority Data

Apr. 11, 1989 [JP] Japan ............... 1-42270[U]
Nov. 2, 1989 [JP] Japan ............... 1-122872[U]

[51] Int. Cl.$^5$ .......................................... A01K 89/027
[52] U.S. Cl. .......................................... 242/245
[58] Field of Search ............... 242/245, 246, 260, 261, 242/262, 302, 303, 318; 188/72.9, 71.1; 192/48.5, 67 R

[56] References Cited

U.S. PATENT DOCUMENTS

| | | | |
|---|---|---|---|
| 952,535 | 3/1910 | Loomis | 192/48.5 |
| 2,760,357 | 8/1952 | Burns | 242/260 X |
| 4,344,587 | 8/1982 | Hildreth | 242/250 X |
| 4,572,448 | 2/1986 | Ban | 242/245 |
| 4,746,077 | 5/1988 | Toda | 242/242 X |
| 4,830,307 | 5/1989 | Lassi et al. | 242/245 |
| 4,834,307 | 5/1989 | Larsson et al. | 242/245 |

FOREIGN PATENT DOCUMENTS

0429923 5/1991 European Pat. Off. ............ 242/245
61-197872 5/1986 Japan .

Primary Examiner—Katherine Matecki
Attorney, Agent, or Firm—Dickstein, Shapiro & Morin

[57] ABSTRACT

A spinning reel comprising a reel body, a spool rotatably and axially movably supported on a spool shaft, and drag brakes for applying a braking force to rotation of the spool shaft. A retainer sleeve is rotatably but axially immovably supported by the reel body for holding the drag brakes. A flanged clutch sleeve is unrotatably and axially movably supported on the spool shaft to be engageable with the retainer sleeve. A control member is provided on the reel body and including contact portions opposed to front and rear faces of the flange of the clutch sleeve. The control member is operable by a clutch lever to move the clutch sleeve into and out of engagement with the retainer sleeve.

9 Claims, 8 Drawing Sheets

SPINNING REEL WITH DRAG BRAKE MECHANISM AND CLUTCH

BACKGROUND OF THE INVENTION

1. FIELD OF THE INVENTION

This invention relates to spinning reels for fishing, and more particularly to a spinning reel comprising a reel body, a spool rotatably and axially movably supported on a spool shaft, and drag brakes for applying a braking force to rotation of the spool shaft.

2. DESCRIPTION OF THE PRIOR ART

This type of spinning reel is described in Japanese Utility Model Publication Kodai No. 61-197872, for example. This spinning reel comprises a reel body having a spool shaft and housing a retainer sleeve for holding drag brakes in a rear portion thereof. A clutch sleeve is relatively unrotatably supported on the spool shaft forwardly of the retainer sleeve. One of the retainer sleeve and clutch sleeve is movable relative to the other. The movable sleeve is urged for engagement with the other sleeve by a spring, so that the drag brakes apply a braking force to the spool shaft. The braking force of the drag brakes is nullified by separating the movable sleeve from the other sleeve against the urging force of the spring, thereby placing the spool shaft in a freely rotatable state.

With the above spinning reel, particularly where the retainer sleeve is movable, a clutch lever for moving the retainer sleeve is very heavy to operate when the braking force is applied by the drag brakes. Where the clutch sleeve is movable, the following problem arises. The clutch sleeve is relatively unrotatably mounted on the spool shaft, and the spring for urging the clutch sleeve toward the retainer sleeve is provided between the clutch sleeve and reel body. Consequently, when the clutch sleeve is moved out of engagement with the retainer sleeve to render the spool shaft freely rotatable, the spring constantly applies a resistance through the clutch sleeve to the spool shaft. This is obstructive to free rotation of the spool supported on the spool shaft.

SUMMARY OF THE INVENTION

The present invention has been made having regard to the disadvantages of the prior art noted above. An object of the present invention, therefore, is to provide a spinning reel which allows the clutch lever to be operable with a light touch, and which allows the spool supported on the spool shaft to rotate freely with no resistance applied to the spool shaft.

To achieve the above object, a spinning reel according to the present invention comprises a reel body, a spool rotatably and axially movably supported on a shaft, drag brakes for applying a braking force to rotation of the spool shaft, a retainer sleeve rotatably but axially immovably supported by the reel body for holding the drag brakes, a clutch sleeve unrotatably and axially movably supported on the spool shaft and engageable with the retainer sleeve, a projection formed on the clutch sleeve and extending radially outwardly therefrom, a control member provided on the reel body and including contact portions opposed to a front face and a rear face of the projection, and a clutch lever provided on the reel body for operating the control member to move the clutch sleeve into and out of engagement with the retainer sleeve.

With this spinning reel, the clutch sleeve is movable into and out of engagement with the retainer sleeve by operating the clutch lever. In other words, a spring is not used as in the known spinning reel, which allows controls for engaging and disengaging the two sleeves to be effected with a light touch in the absence of the extra resistance applied to the spool shaft. In this way, switching is made between a braked state and a freely rotatable state of the spool shaft, assuring a smooth, free rotation of the spool shaft.

Thus, the present invention provides a spinning reel which allows the clutch lever to be operated with a light touch to engage and disengage the two sleeves, and which allows the spool supported on the spool shaft to rotate freely when the sleeves are disengaged.

Other objects, features and advantages of the present invention will be apparent from the following description.

BRIEF DESCRIPTION OF THE DRAWINGS

The drawings show a spinning reel according to the present invention, in which.

DETAILED DESCRIPTION OF THE PREFERRED EMBODIMENTS

Spinning reels according to the present invention will be described in detail hereinafter with reference to the drawings.

Figure 1:
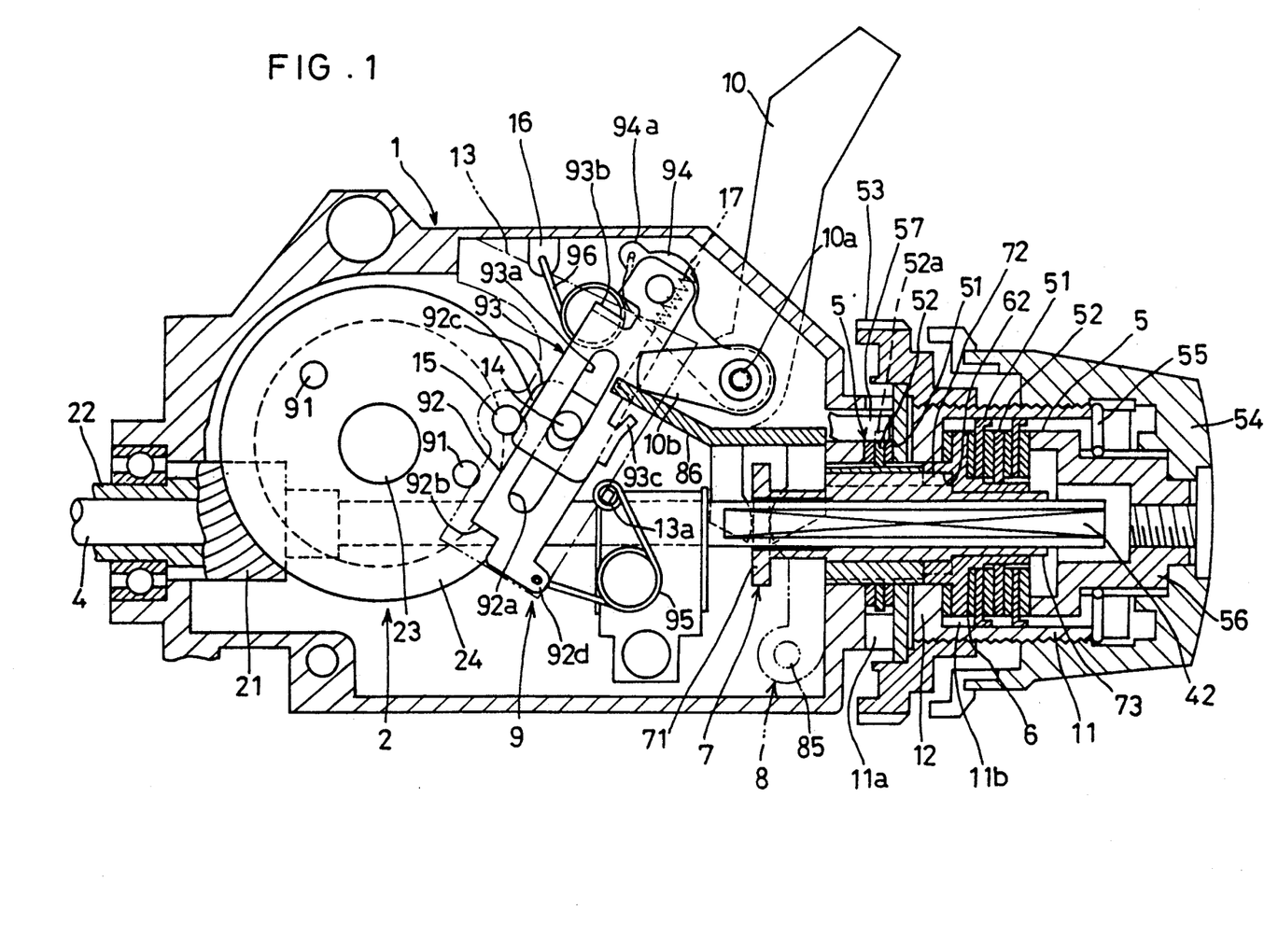
FIG. 1 is a partial side view in vertical section of the spinning reel.
Figure 6:
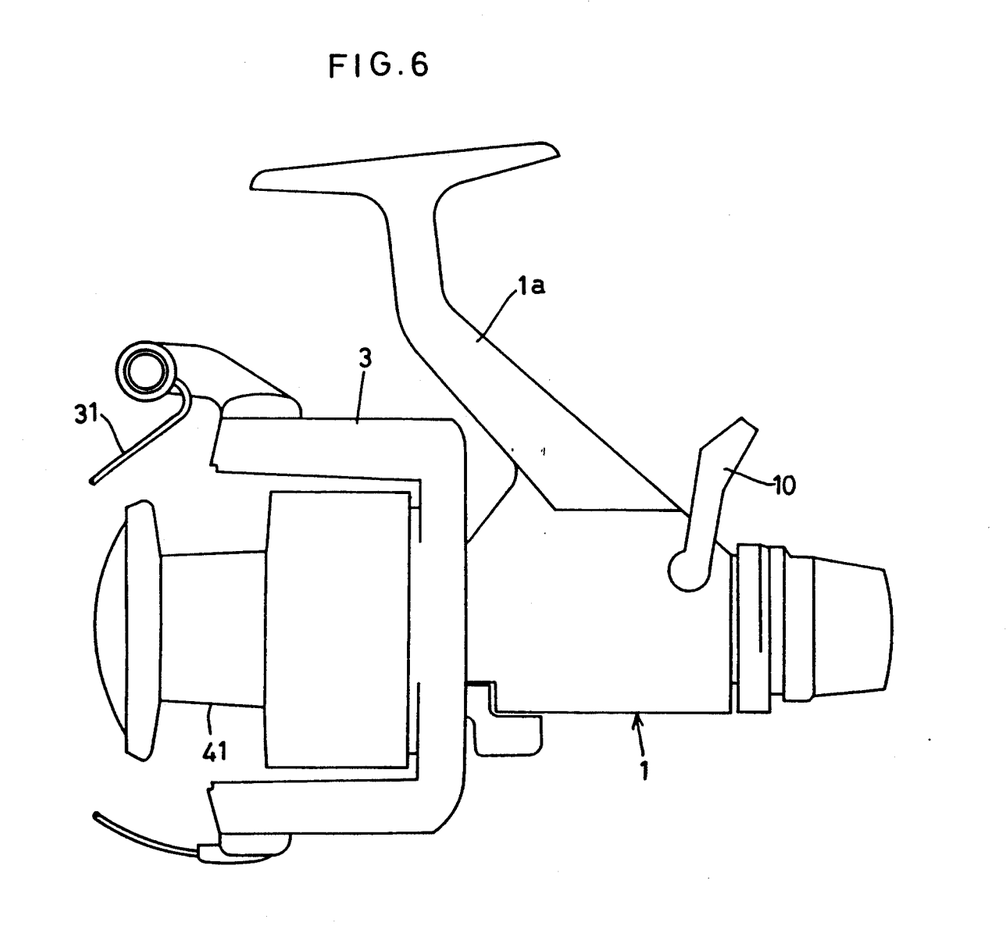
FIG. 6 is a side view of the entire spinning reel.

The spinning reel shown in FIGS. 1 and 6 comprises a hollow reel body 1 having a leg 1a extending from a top surface thereof for connection to a fishing rod and defining a perforation in a front face thereof. A tubular drive shaft 22 having a pinion gear 21 formed integral therewith is rotatably supported through a bearing in the perforation of the reel body 1. The drive shaft 22 carries a rotatable frame 3 attached to a forward end thereof and having a bail arm 31. The drive shaft 22 supports a spool shaft 4. The shaft 4 is rotatable and axially movable with respect to the shaft 22. The spool shaft 4 carries a spool 41 at a forward end thereof. Drag brakes 5 are disposed between a rear end of the spool shaft 4 and a rear end of the reel body 1. Further, the reel body 1 rotatably supports a handle shaft 23 extending perpendicular to the drive shaft 22. The handle shaft 23 carries a master gear 24 mounted on a portion thereof extending into the reel body 1. The master gear 24 is meshed with the pinion gear 21 to constitute a transmission mechanism 2. Thus, the rotatable frame 3 is driven by the drive shaft 22 to take up a fishing line.

As shown in FIG. 1, the rear end of the reel body 1 has a perforation and a peripherally threaded support sleeve 11 extending rearwardly from the perforation. The support sleeve 11 has an interior space divided into a front chamber 11a and a rear chamber 11b by a partition 12 defining a center bore.

The drag brakes 5 comprise two sets, i.e. a plurality of fixed braking elements 51 and a plurality of rotatable braking elements 52. These sets of drag brakes 5 are arranged in the front chamber 11a and rear chamber 11b. The respective sets of drag brakes 5 are separately adjustable through first and second adjusting elements 53 and 54 meshed with the support sleeve 11, to enable a fine adjustment of a braking force applied to the spool shaft 4.

The rotatable braking element 52 mounted in the front chamber 11a includes engaging teeth 52a which engage with a sound pawl 57 provided on the reel body 1 for producing a sound.

The second adjusting element 54 houses a pressing member 56 for applying pressure, through a spring 55, on a rearmost face of the drag brakes 5 mounted in the rear chamber 11b.

Further, the rear end of the reel body 1 houses a retainer sleeve 6 rotatable about the spool shaft 4 but not axially movable, for retaining the rear drag brakes 5. A clutch sleeve 7 is mounted on the spool shaft 4 to be unrotatable relative thereto and movable forwardly relative to the retainer sleeve 6. The clutch sleeve 7 includes a flange 71 formed integral therewith and extending radially outwardly. The reel body 1 houses a control member 8 including a plurality of contact portions 81 opposed to front and rear faces of the flange 71, a mechanism 9 for automatically returning the control member 8, and a clutch lever 10 for rocking the control member 8 to move the clutch sleeve 7 into and out of engagement with the retainer sleeve 6.

Figure 2:
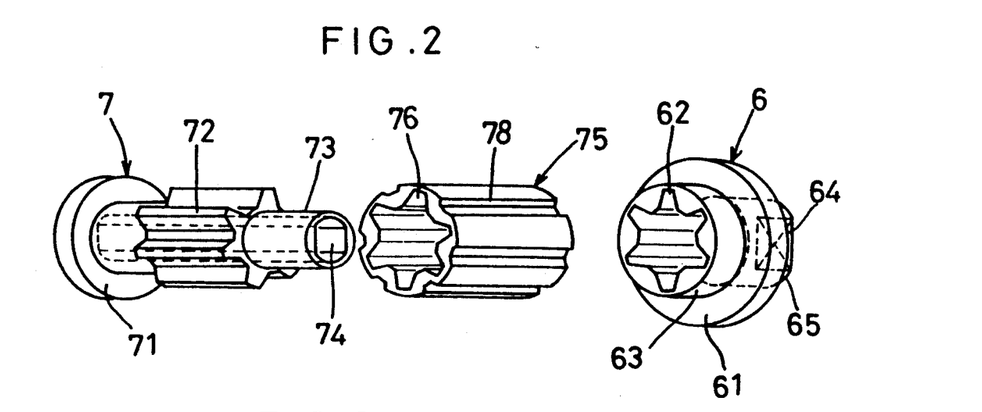
FIG. 2 is an exploded perspective view of a clutch shown in FIG. 1.

Specifically, as shown in FIG. 2, the retainer sleeve 6 supported around the rear portion of the spool shaft 4 includes a flange 61 formed integral with a longitudinally intermediate position thereof. A first tubular portion 63 is formed forwardly of the flange 61, which defines engaging recesses 62 in an inside wall thereof. A second tubular portion 65 including a non-circular section 64 is formed rearwardly of the flange 61. The rotatable braking elements 52 of the rear drag brakes 5 are in engagement with the non-circular section 64 of the second tubular portion 65, while the fixed braking elements 51 are supported peripherally of the second tubular portion 65.

The clutch sleeve 7 mounted on the spool shaft 4 and extending forwardly of the retainer sleeve 6 similarly has a tubular overall configuration, with the flange 71 formed integrally wit one longitudinal end thereof. The clutch sleeve 7 defines projections 72 peripherally of an intermediate portion thereof for engagement with the recesses 62 formed in the retainer sleeve 6. The clutch sleeve 7 further includes a support tube portion 73 at the other end thereof for supporting the retainer sleeve 6, a non-circular section 74 being defined therein. The retainer sleeve 6 is supported on the support tube portion 73 of the clutch sleeve 7, and the clutch sleeve 7 is forwardly movable relative to the retainer sleeve 6. This construction prevents disalignment between the retainer sleeve 6 and clutch sleeve 7.

A guide sleeve 75 is provided for guiding the clutch sleeve. The sleeve 75 has recesses 76 formed in an inside wall thereof. The recesses 76 engage with the projections 72. The clutch sleeve 7 is inserted into the guide sleeve 75 with the projections 72 engaging the recesses 76, whereby the clutch sleeve 7 is axially movable relative to and rotatable with the guide sleeve 75. The guide sleeve 75 defines a plurality of grooves 78 on an outer periphery thereof. The rotatable braking element 52 of the front drag brakes 5 is in engagement with the grooves 78, while the fixed braking elements 51 are supported on the peripheral surface of the guide sleeve 75.

Figures 3, 5:
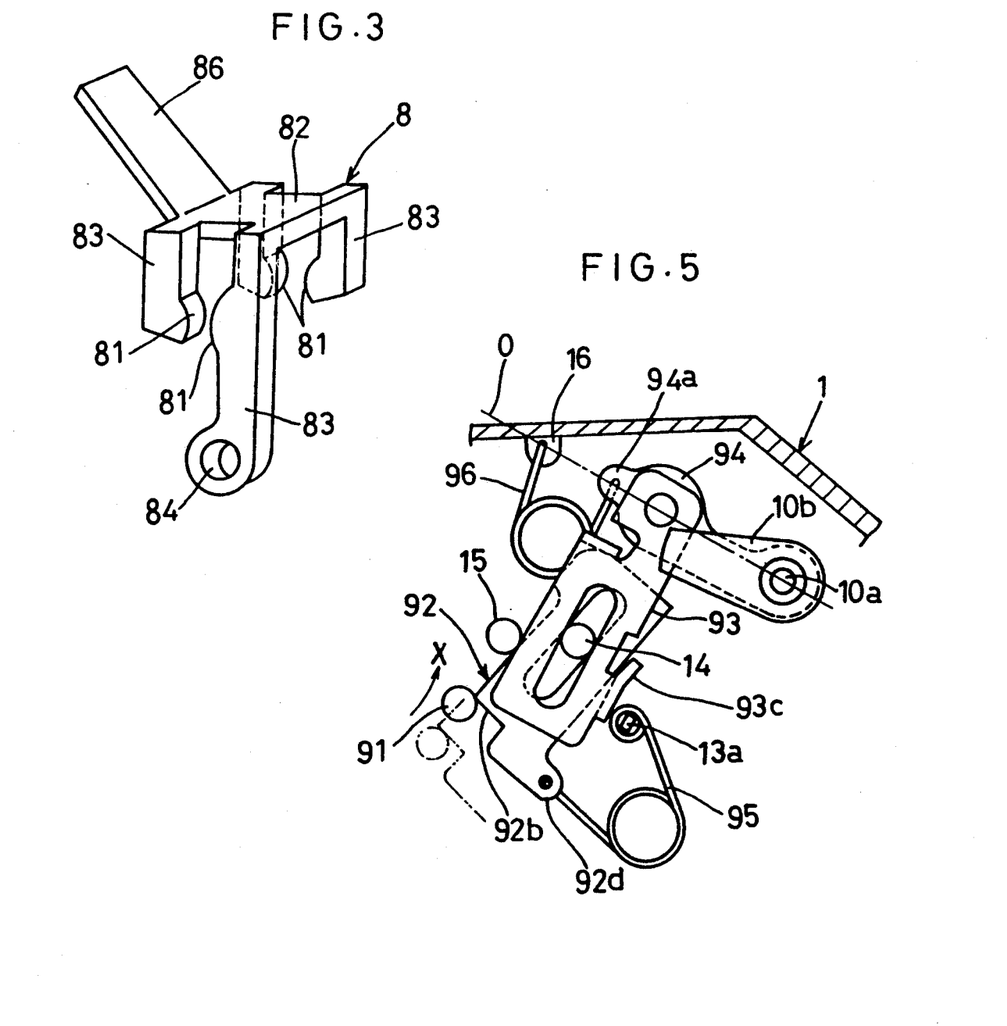
FIG. 3 is a perspective view of a control member.
FIGS. 4 and 5 are partial side view in vertical section illustrating operating states, respectively.

The clutch sleeve 7 is movable by the control member 8 which is constructed as shown in FIG. 3. The control member 8 includes a rectangular frame 82, and four legs 83 formed integral with the frame 82 and depending from the four corners thereof. The respective legs 83 have arcuate bosses on opposed inward faces thereof to define the contact portions 81. These contact portions 81 are disposed adjacent and opposed to the front and rear faces of the flange 71 formed on the clutch sleeve 7. One of the legs 83 extends further downwardly from the other legs, and defines a bore 84 at an extreme end thereof. The control member 8 is pivotably supported by the reel body 1 by means of a pin 85 extending through the bore 84.

The rectangular frame 82 includes a control rod 86 extending forwardly and upwardly therefrom.

The control member 8 is operable by the clutch lever 10 pivotably supported at a proximal end thereof opposed to opposite lateral walls of the reel body 1, by a connecting shaft 10a extending through the reel body 1. The connecting shaft 10a carries a cam member 10b for contacting the control rod 86 of the control member 8, such that the cam member 10b causes the control rod 86 to pivot vertically with a rocking operation of the clutch lever 10. The pivotal movement of the control rod 86 in turn causes the control member 8 to pivot, which drives the clutch sleeve 7 through the contact portions 81 to move back and forth.

The cam member 10b may be formed integral with the clutch lever 10.

As noted hereinbefore, the reel body 1 houses the return mechanism 9 for automatically returning the control member 8. The return mechanism 9 includes two kick pins 91. The pins 91 are located on a side face of the master gear 24 with a 180-degree phase difference. The mechanism 9 also includes a contact gear 92 which is oscillatable through contact with either of the kick pins 91, and a movable member 93 and an interlocking member 94 which are located between the contact member 92 and connecting shaft 10a.

The contact member 92 and movable member 93 are oscillatably supported on a single support axis 14 fixed to a stationary element 13 fixedly mounted in the reel body 1. The contact member 92 includes a slot 92a for receiving the support axis 14, a first contact portion 92b for contacting a projection 93b formed on the movable member 93, and a spring bearing 92d. A return spring 95 is provided between the spring bearing 92d and a spring bearing piece formed on the stationary element 13.

Figure 4:
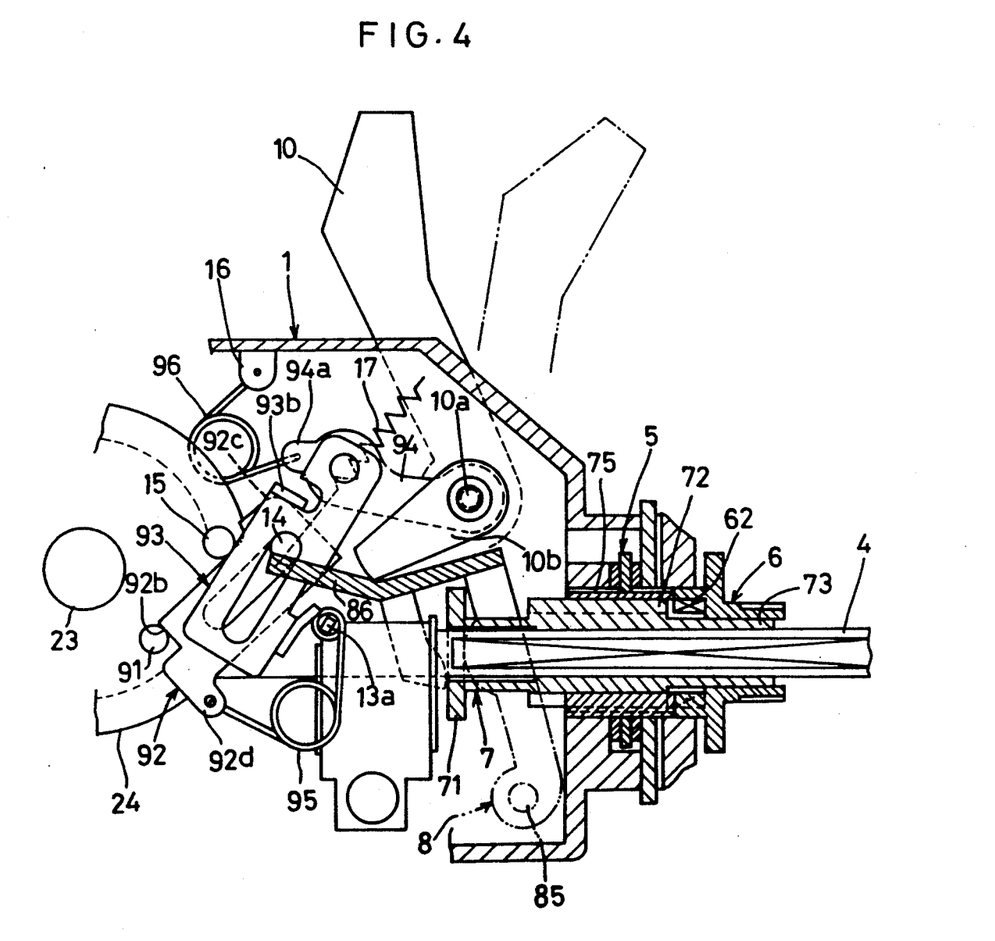

The contact member 92 is movable between an advanced position and a retracted position. In the advanced position, as shown in FIG. 4, the contact member 92 is locked against the force of return spring 95 by the support axis 14 and a regulator pin 15 formed on the stationary member 13, with the first contact portion 92b projecting into a locus of revolution of the kick pins 91. The contact member 92 may be returned from the position shown in FIG. 4 to the retracted position shown in FIG. 1. In the retracted position, the contact member 92 is locked against the force of return spring 95 by the support axis 14 and a regulator piece 93c formed on the movable member 93, with the first contact portion 92b retracted from the locus of revolution of the kick pins 91.

The movable member 93 includes, besides the projection 93b and regulator piece 93c, a slot 93a for receiving the support axis 14. The movable member 93 is fixed at the end adjacent the projection 93b to a forward end of the interlocking member 94. When the contact member 92 is in the advanced position as shown in FIG. 4, the second contact portion 92c is in contact with the projection 93b.

The interlocking member 94 includes a spring bearing piece 94a formed at the end thereof connected to the movable member 93. A torsion spring 96 is provided between the spring bearing piece 94a and a spring bearing piece 16 projecting from an upper inside wall of the reel body 1. The interlocking member 94 is relatively unrotatably supported at a proximal end thereof by the connecting shaft 10a for operative connection with the clutch lever 10.

The torsion spring 96 urges the interlocking member 94 in one direction which is reversed midway in oscillation thereof. Thus the interlocking member 93 is stopped at an advanced position or a retracted position.

The way in which the spinning reel having the above construction operates will be described next.

First, when casting the fishing line would on the spool 41, the clutch lever 10 is operated from a retracted position to an advanced position as shown in FIG. 4. As a result, the control member 8 operatively connected to the clutch lever 10 drives the clutch sleeve 7 forwardly relative to the retainer sleeve 6, disengaging the projections 72 from the recesses 62. This releases the spool shaft 4 from the braking force of the drag brakes 5, thereby rendering the spool provided on the spool shaft 4 freely rotatable. The angler then waits for fish to strike the bait. The line smoothly extendable in this state provides for a good fish bite.

In this state, the first contact portion 92b projects into the locus of revolution of kick pins 91.

A minor resistance is applied from the front drag brakes 5 to the spool shaft 4 in the described example to prevent the line from being drawn out by the weight of a catch device. However, no resistance may be applied to allow free rotation of the spool 41.

When a fish bites the bait, the handle shaft 23 is turned with a handle bar. This rotates the master gear 24 and the kick pin 91, as shown in phantom lines in FIG. 5, contacts the first contact portion 92b of the contact member 92. Then the contact member 92 is moved in the direction of arrow X in FIG. 5 to a solid-line position against the return spring 95. The movable member 93 is also moved in the direction of arrow X with the movement of the contact member 92. When the kick pin 91 leaves the first contact portion 92b, the position at which the torsion spring 96 engages the interlocking member 94 moves beyond a reversing point 0. Then the urging direction of the torsion spring 96 is reversed, which causes the movable member 93 to move in the X direction on its own to the retracted position as shown in FIG. 1. With the movement of the movable member 93, the clutch lever 10 switches to the retracted position. As a result, the control member 8 is moved to the position shown in FIG. 1 by the return spring 17 provided between the clutch lever 10 and control member 8. This causes the clutch sleeve 7 to move rearwardly with the projections 72 thereof engaging the recesses 62 of the retainer sleeve 6. On the other hand, the contact member 92 is moved by the return spring 95 to the position shown in FIG. 1.

The engagement between the retainer sleeve 6 and clutch sleeve 7 may be established also by operating the clutch lever 10.

By engaging the retainer sleeve 6 and clutch sleeve 7 as described above, the drag brakes 5 apply a rotational resistance to the spool shaft 4. In this state, the angler winds up the line on the spool 41 while controlling the fish caught by the hook.

Another example of return mechanism for automatically returning the control member 8 will be described hereinafter.

Figure 7A:
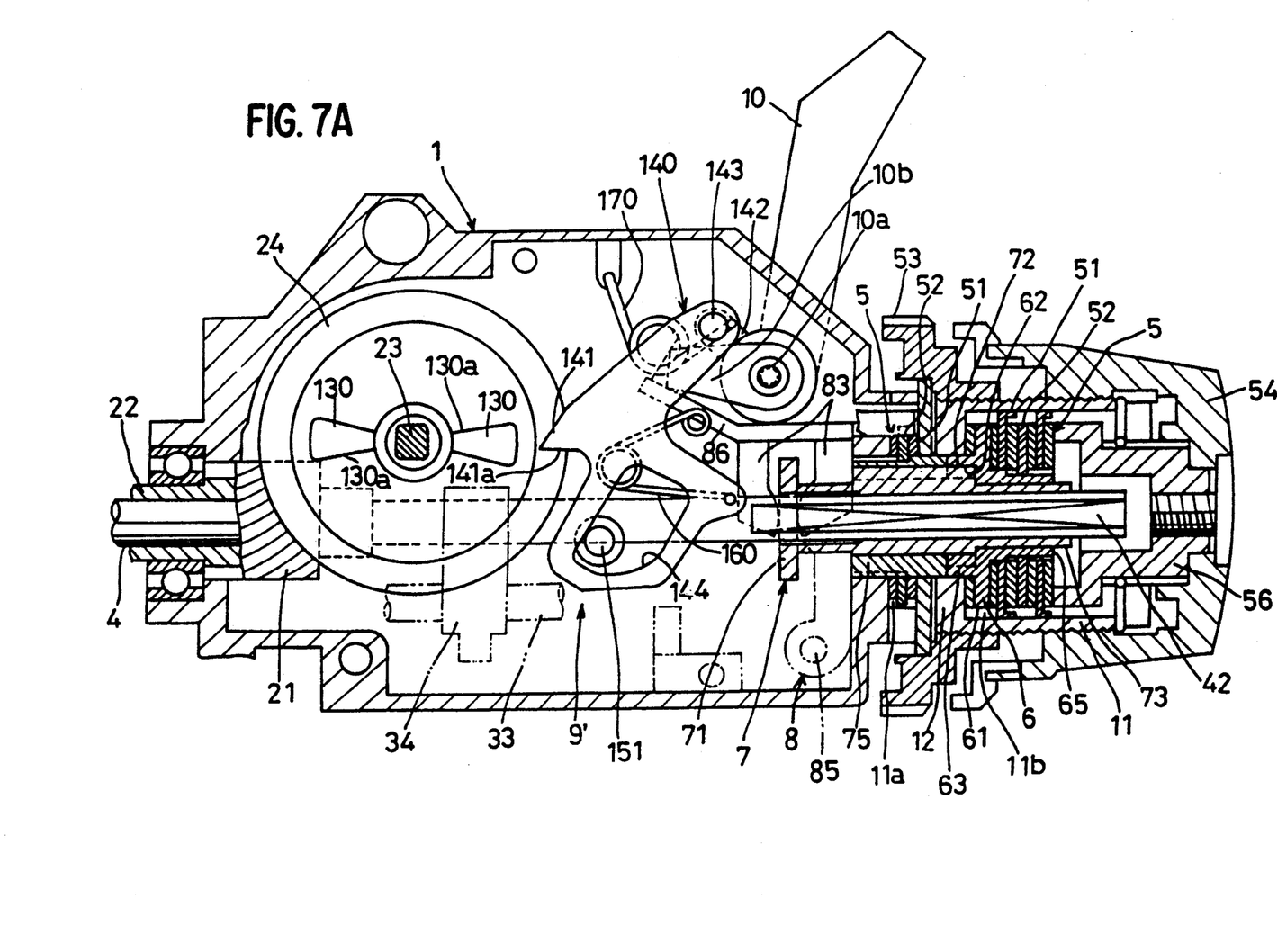
FIG. 7A is a partial side view in vertical section of a spinning reel in a second embodiment.
Figure 7B:
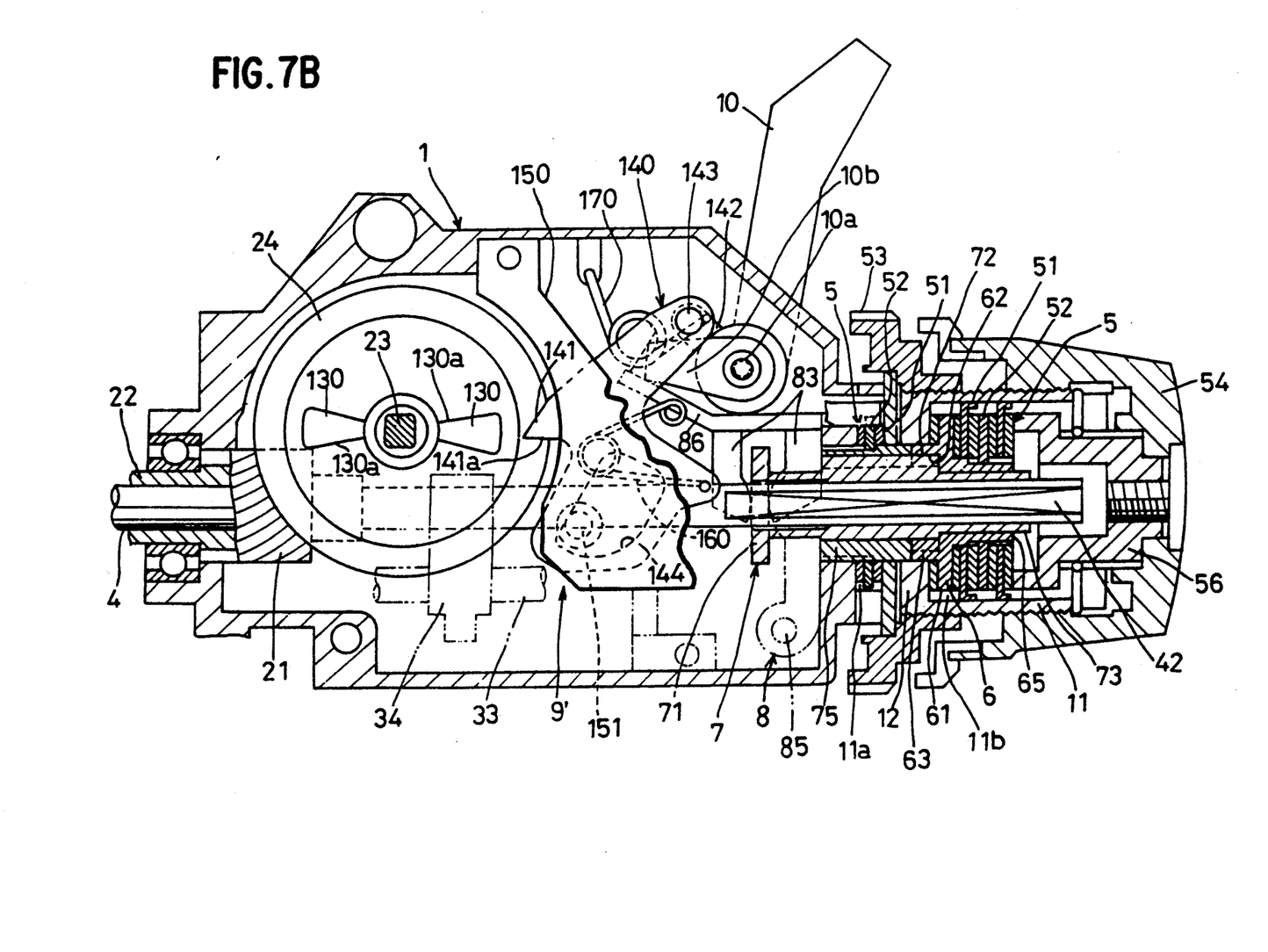
FIG. 7B is another partial side view in vertical section of the spinning reel in accordance with the second embodiment.
Figure 8:
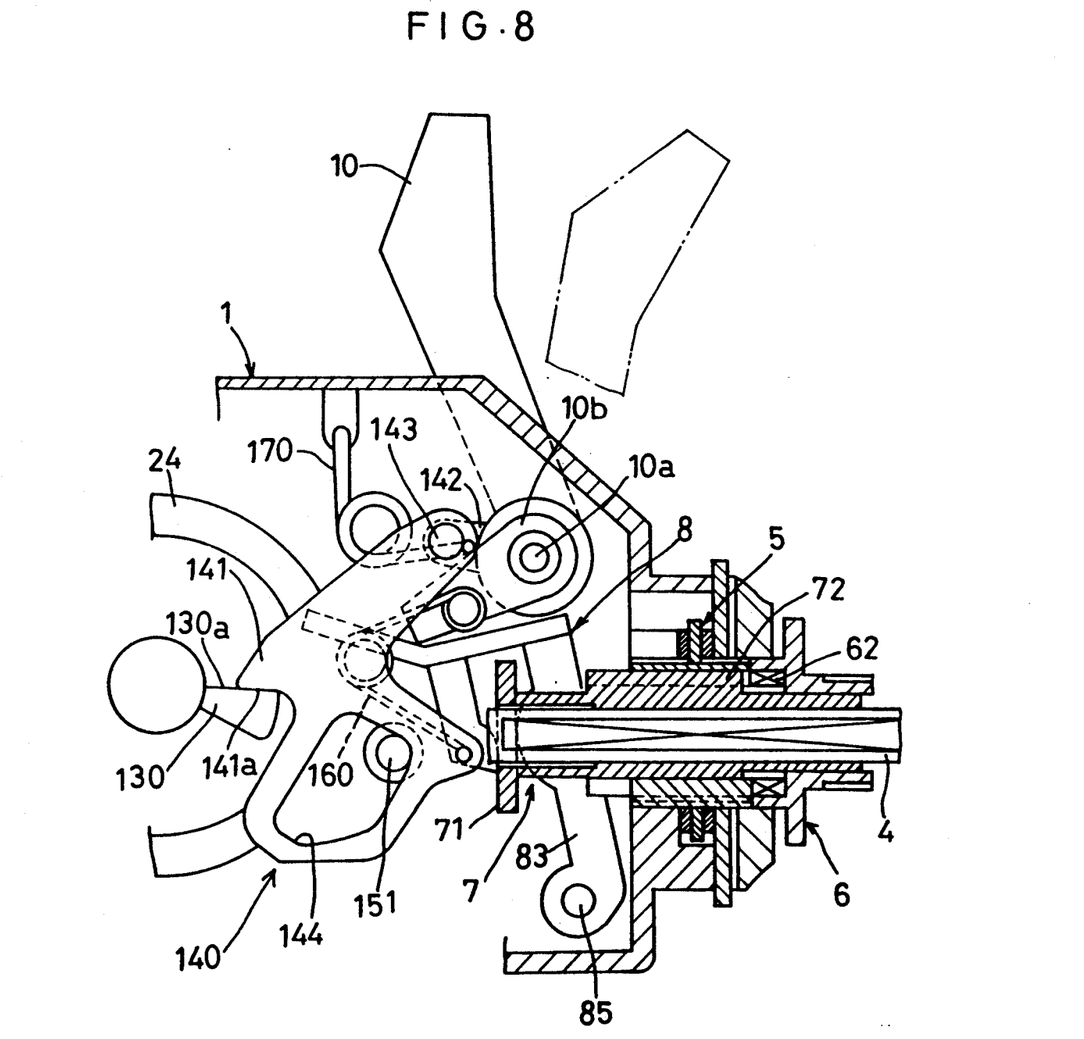
FIG. 8 is a partial side view in vertical section illustrating an operating state of the spinning reel shown in FIGS. 7A and 7B.

As shown in FIGS. 7 and 8, a return mechanism 9' includes two return projections 130 formed integrally on one lateral face of the master gear 24 with a 180-degree phase difference, a return plate 140 oscillatable back and forth, and a stationary plate 150 fixed to one lateral side of the reel body 1. The stationary plate 150 is not illustrated in FIG. 7A. A portion of the plate 150 is illustrated in FIG. 7B.

The return plate 140 includes a pawl portion 141 formed at a forward position thereof and having a flat face 141a for contacting the return projections 130. The return plate 140 is connected at an upper rear position thereof through a connecting shaft 143 to an arm 142 projecting from a rotary shaft 10a of the clutch lever 10. The return plate 140 is oscillatable with a fore and after operation of the clutch lever 10, between a forward position with the pawl portion 141 projecting into a locus of revolution of the return projections 130 and a rear position with the pawl portion 141 moved away from the return projections 130. The return plate 140 defines an approximately rectangular positioning bore 144 in a lower middle position thereof. A regulator pin 151 projects from the stationary plate 150 into the positioning bore 144 for limiting fore and aft oscillations of the return plate 140.

With the automatic return mechanism as constructed above, the contact member and movable member shown in FIGS. 1 and 5 are integrated. This realizes a simplified overall construction with advantages in manufacture and use.

Each of the return projections 130 formed on the master gear 24 has a sector-shaped section with a flat surface 130a extending radially. Such return projections 130 contacting the flat surface 141a of the pawl portion 141 of the return plate 140 prevent early wear of the pawl portion 141 as well as the return projections 130 per se. This promotes durability of the return plate 140 and the master gear 24 formed of a light alloy such as of aluminum.

Reference numeral 160 in FIGS. 7 and 8 indicates a torsion spring mounted between a rear intermediate position of the return plate 140 and the stationary plate 150. This spring 160 is approximately V-shaped with a coiled intermediate portion, and has an unstable switching function. The spring 160 acts to hold the return plate 140 in the forward position with the pawl portion 141 projecting into the locus of revolution of the return projections 130 of the rear position with the pawl portion 141 moved away from the return projections 130.

The return plate 140 is disposed inwardly of the stationary plate 150, and the torsion spring 160 inwardly of the return plate 140. Thus, the return plate 140 is supported between the coiled intermediate portion of the spring 160 and the stationary plate 150. In this way, a simple construction is provided by effectively utilizing the necessary components, i.e. the spring 160 and stationary plate 150, to guide the return plate 140 in its oscillations.

Reference numeral 170 indicates a torsion spring having an unstable switching function and mounted between an upper inside position of the reel body 1 and the arm 142. This spring 170 acts to hold the clutch lever 10 in the forward or rear position. A traverse shaft 33 (FIG. 7) is mounted inside the reel body 1. The shaft 33 has a gear which is meshed with the pinion gear 21. Reference numeral 34 indicates a coupling member for connecting the spool shaft 4 to the traverse shaft 33 and supporting the spool shaft 4 parallel thereto. Thus, rotation of the traverse shaft 33 causes the spool shaft 4 through the coupling member 34 to move back and forth.

The following modification may be made to the construction for moving the clutch sleeve 7 into and out of engagement with the retainer sleeve 6 by oscillating the control member 8 through the clutch lever 10.

Figure 9:
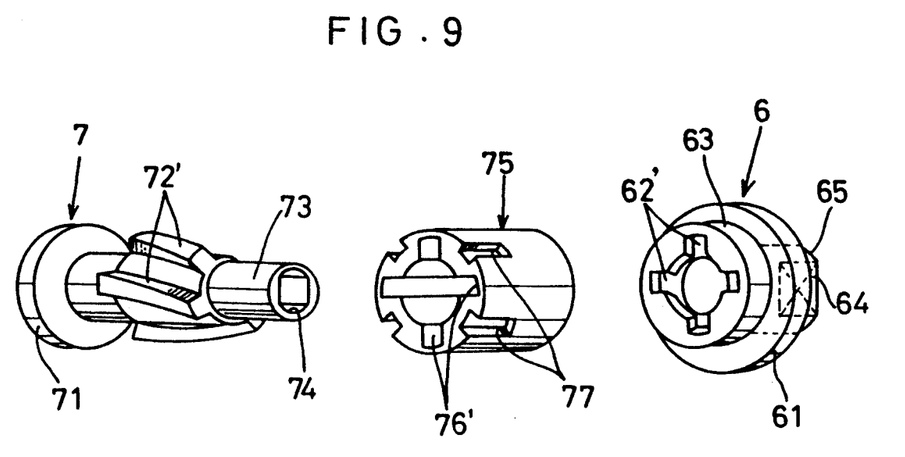
FIG. 9 is a perspective view of a modified clutch.

In the example shown in FIG. 9, the retainer sleeve 6 includes a flange 61 formed integral with a longitudinally intermediate position thereof. A first tubular portion 63 is formed forwardly of the flange 61, and a second tubular portion 65 including a non-circular section 64 is formed rearwardly of the flange 61. The first tubular portion 65 defines engaging recesses 62' in the form of channel-shaped grooves in an inside wall thereof. The rotatable braking elements 52 of the rear drag brakes 5 are in engagement with the non-circular section 64 of the second tubular portion 65, while the fixed braking element 51 are supported peripherally of the second tubular portion 65 to be opposed to and rotatable relative to the rotatable braking elements 52.

The clutch sleeve 7 has a flange 71 formed integrally with a forward end thereof. The clutch sleeve 7 defines a plurality of projections 72' having a rectangular section peripherally of an intermediate portion thereof for engagement with the recesses 62' formed in the retainer sleeve 6. The clutch sleeve 7 further includes a support tube portion 73 rearwardly of the projections 72'. A disalignment between the retainer sleeve 6 and clutch sleeve 7 is prevented by movably supporting the retainer sleeve 6 on the support tube portion 73, so that the projections 72' are engageable with and disengageable from the recesses 62' in a reliable way. The clutch sleeve 7 defines an axial non-circular bore 74 extending therethrough, which engages with a non-circular portion 42 of the spool shaft 4 shown in FIGS. 1 and 7. Thus, the clutch sleeve 7 is supported on the spool shaft 4 to be axially movable but not rotatable relative thereto.

A guide sleeve 75 is provided for guiding the clutch sleeve 7. The sleeve 75 has a plurality of recesses 76' formed in an inside wall thereof. The recesses 76' engage with the projections 72'. The clutch sleeve 7 is inserted into the guide sleeve 75 with the projections 72 engaging the recesses 76, whereby the clutch sleeve 7 is axially movable but not rotatable relative to the guide sleeve 75. The guide sleeve 75 defines a plurality of grooves 77 on an outer periphery thereof. The rotatable braking element 52 of the front drag brakes 5 is in engagement with the grooves 78, while the fixed braking elements 51 are supported on the peripheral surface of the guide sleeve 75 as opposed to the rotatable braking element 52.

Figure 10:
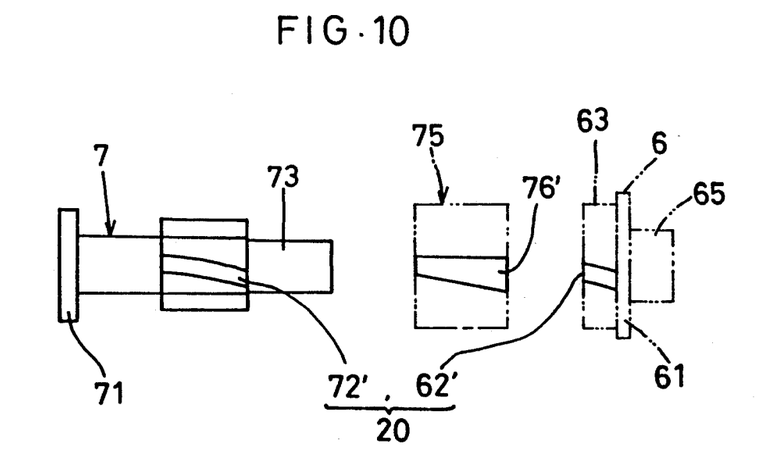
FIG. 10 is a schematic plan view of the modified clutch.

As shown in FIGS. 9 and 10, the engaging projections 72' are formed peripherally of the clutch sleeve 7 as twisted rightward (clockwise) in a direction of rotation from one longitudinal end adjacent the flange 71 to the other. The engaging recesses 62' are formed on the inside wall of the retainer sleeve 6 also as twisted in the same direction as the projections 72'.

Thus, in the embodiment shown in FIGS. 9 and 10, the engaging projections 72' and recesses 62' twisted clockwise imparts a resistance to an axially forward movement of the clutch sleeve 7 when a clockwise torque is applied by fish to the spool shaft 4. In other words, the twisted construction of the engaging projections 72' and recesses 62' forms an engagement control section 20. When the projections 72' and recesses 62' are engagement and a torque is applied to the spool shaft 4 as a result of a load transmitted from the fishing line, the engagement control section 20 applies a resistance to the axial movement of the clutch sleeve 7 relative to the retainer sleeve 6. Even if the spool shaft 4 is wrenched by such a torque relative to the clutch sleeve 7, the clutch sleeve 7 is prevented from moving axially with a fore and aft movement of the spool shaft 4.

As shown in FIG. 10, each recess 76' of the guide sleeve 75 is flared from the forward end to the rear end to correspond to the twisting displacement of each projection 72'. As a result, even when the projections 72' and recesses 62' are in engagement, the clutch sleeve 7 is axially movable relative to the guide sleeve 75, while the engagement between the projections 72' and recesses 62' prevents a relative rotation between the clutch sleeve 7 and guide sleeve 75.

When the projections 72' and recesses 62' are engaged in order for the rear drag brakes 5 to apply a braking force to the spool shaft 4 in winding up the line on the spool 41, the twisted construction of the projections 72' and recesses 62' constituting the engagement control section 20 imparts a resistance to the axial movement of the clutch sleeve 7 relative to the retainer sleeve 6. Consequently, the clutch sleeve 7 is prevented from moving axially relative to the spool shaft 4, thereby maintaining the projections 72' and recesses 62' in engagement. This also avoids an interruption of the braking force applied to the spool shaft 4 by the rear drag brakes 5.

According to the above construction, when the projections 72' and recesses 62' are engaged in order for the drag brakes 5 to apply a braking force to the spool shaft 4, the engagement control section 20 prevents an axial movement of the clutch sleeve 7 relative to the retainer sleeve 6, thereby assuring maintenance of the engagement between the projections 72' and recesses 62'. This avoids separation of the projections 72' and recesses 62' and an interruption of the braking force applied to the spool shaft 4 by the drag brakes 5, thereby enabling a desired clutch.

In the foregoing embodiments, two sets of front and rear drag brakes 5 are separately arranged within the reel body 1. However, the present invention may be practiced by providing a single set of drag brakes 5 to apply a braking force to the rotation of the spool shaft 4.

Further, in the described embodiments, the clutch sleeve 7 includes the engaging projections, and the retainer sleeve 6 includes the recesses engageable with these projections. Instead of this, the recesses may be formed in the clutch sleeve 7, and the projections on the retainer sleeve 6.

What is claimed is:

1. A spinning reel comprising:
    a reel body (1),
    a rotatable and axially movable spool (41) and a spool shaft (4), the spool (41) being connected to the spool shaft (4) such that said spool (41) and said spool shaft (4) rotate in unison and move axially in unison,
    a drag brake mechanism (5) for applying a braking force to resist rotation of said spool shaft (4), said drag brake mechanism (5) being provided at a rear position of said reel body (1), said braking force being adjustable through an adjusting element (54), wherein said adjusting element (54) is located at a rear position of said reel body (1) such that said braking force is adjustable by a user from outside of said reel body (1),
    a retainer sleeve (6) rotatably but axially immovably supported by said reel body (1) for holding said drag brake mechanism (5),
    a clutch sleeve (7) unrotatably and axially movably supported on said spool shaft (4), said clutch sleeve including a forward engaging portion (71), said clutch sleeve further including a rear engaging portion (72) for engaging said retainer sleeve (6), said forward engaging portion being located in front of said rear engaging portion (72),
    a control member (8) located inside of said reel body (1) and including first and second contact portions (81, 81) for engaging said forward engaging portion (71) of said clutch sleeve and for reciprocating said clutch sleeve (7) along said axis, and
    a clutch lever (10) provided on said reel body (1) and separately from said control member (8) for operating said control member (8) to move said clutch sleeve (7) into and out of engagement with said retainer sleeve (6), said clutch lever being pivotable with respect to said reel body, said clutch lever having first and second ends, said clutch lever being arranged such that pivotably moving said first end of said clutch lever in a first direction causes said second end (10b) of said clutch lever to press against said control member (8) and cause said rear engaging portion (72) of said clutch sleeve (7) to move out of engagement with said retainer sleeve (6), and such that said control member moves said rear engaging portion (72) into engagement with said retainer sleeve (6) when said first end of said clutch lever is pivotably mounted in a second direction, said second direction being opposite to said first direction,
    said drag brake mechanism including drag brakes (5), said drag brakes being disposed rearwardly of said control member (8) and adjacent to said adjusting element (54), such that said braking force is adjusted by operating said adjusting element.

2. A spinning reel as claimed in claim 1, wherein said forward engaging portion of said clutch sleeve includes a radially outwardly extending engaging projection (71) having front and rear faces, said first and second contact portions of said control member being opposed to said front and rear faces of said engaging projection, respectively.

3. A spinning reel as claimed in claim 2, wherein said projection (71) is located between said contact portions (81, 81).

4. A spinning reel as claimed in claim 1, wherein engaging projections (72') are formed on one of said retainer sleeve (6) and said clutch sleeve (7), with engaging recesses (62') formed in the other of said retainer sleeve (6) and said clutch sleeve (7), said engaging projections (72') and said engaging recesses (62') constituting an engagement control section (20) for applying a resistance to axial movement of said clutch sleeve (7) relative to said retainer sleeve (6).

5. A spinning reel as claimed in claim 4, wherein said control member (8) includes a rectangular frame (82), and four legs (83) depending from corners of said frame (82), said contact portions (81) comprising arcuate bosses formed on opposed inward faces of said legs (83).

6. A spinning reel as claimed in claim 5, wherein said drag brakes (5) include a first set located at a front chamber (11a) and a second set located at a rear chamber (11b), said rear chamber (11b) being partitioned from said front chamber (11a), and wherein said reel includes a second adjusting element (53) for independently adjusting said first set, thereby allowing for fine adjustment of said braking force.

7. A spinning reel as claimed in claim 1, further comprising a return mechanism (9) for automatically moving the control member (8) to move said rear engaging portion (72) into engagement with said retainer sleeve (6).

8. A spinning reel as claimed in claim 7, further comprising a transmission mechanism having a master gear (24), said return mechanism including a return plate (140) and a projection (130) for engaging said plate, said projection being formed on said master gear, said return plate being pivotable between forward and rearward positions.

9. A spinning reel comprising:
    a reel body (1),
    a rotatable and axially movable spool (41) and a spool shaft (4), the spool (41) being connected to the spool shaft (4),
    a drag brake mechanism (5) for applying a braking force to resist rotation of said spool shaft (4), said drag brake mechanism (5) being provided at a rear outer position of said reel body (1), said braking force being adjustable through an adjusting element (54) provided at a rear outermost position of said reel body (1),
    a retainer sleeve (6) rotatably but axially immovably supported by said reel body (1) for holding said drag brake mechanism (5),
    a clutch sleeve (7) unrotatably and axially movably supported on said spool shaft (4) and engageable with said retainer sleeve (6),
    a projection (71) formed on said clutch sleeve (7) and extending radially outwardly therefrom,
    a control member (8) provided on said reel body (1) and including contact portions (81, 81) opposed to a front face and a rear face of said projection (71), said contact portions (81, 81) being adjacently opposed to each other across said projection (71) along an axis of said spool shaft (4) so as to reciprocate said clutch sleeve (7) along said axis, and
    a clutch lever (10) provided on said reel body (1) and separately from said control member (8) for operating said control member (8) to move said clutch sleeve (7) into and out of engagement with said retainer sleeve (6);
    wherein said drag brake mechanism includes drag brakes (5);

wherein said clutch sleeve (7) is disposed on the rear end of said spool shaft (4) and forwardly of said retainer sleeve (6);

wherein engaging projections (72') are formed on one of said retainer sleeve (6) and said clutch sleeve (7), with engaging recesses (62') formed in the other of said retainer sleeve (6) and said clutch sleeve (7), said engaging projections (72') and said engaging recesses (62') constituting an engagement control section (20) for applying a resistance to axial movement of said clutch sleeve (7) relative to said retainer sleeve (6); and wherein said engaging projections (72') extend axially helically, with said engaging recesses (62') correspondingly shaped for engagement with said engaging projections (72').

* * * * *